UNITED STATES PATENT OFFICE.

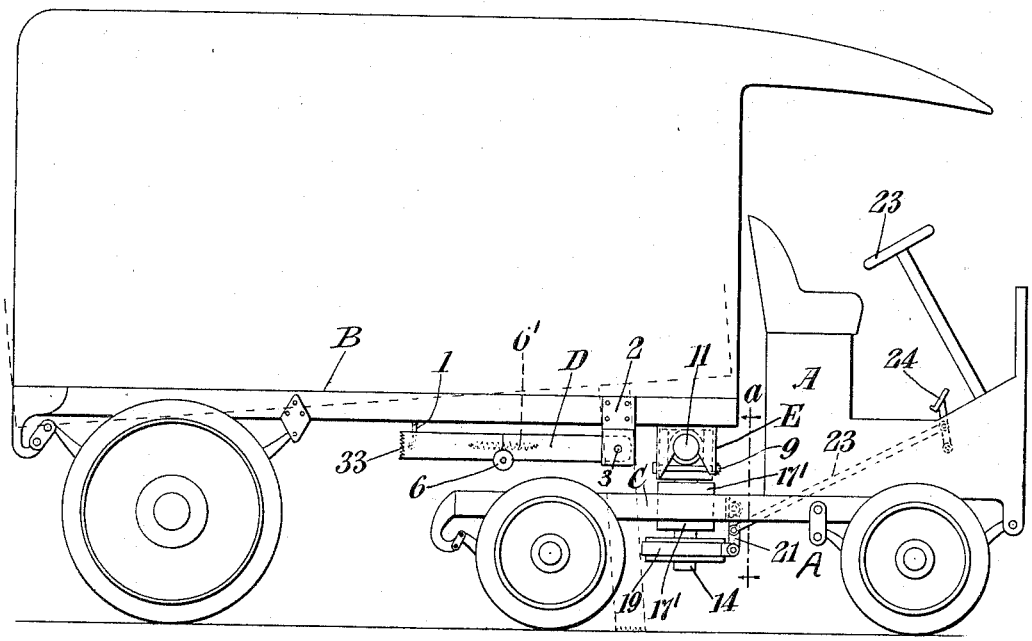
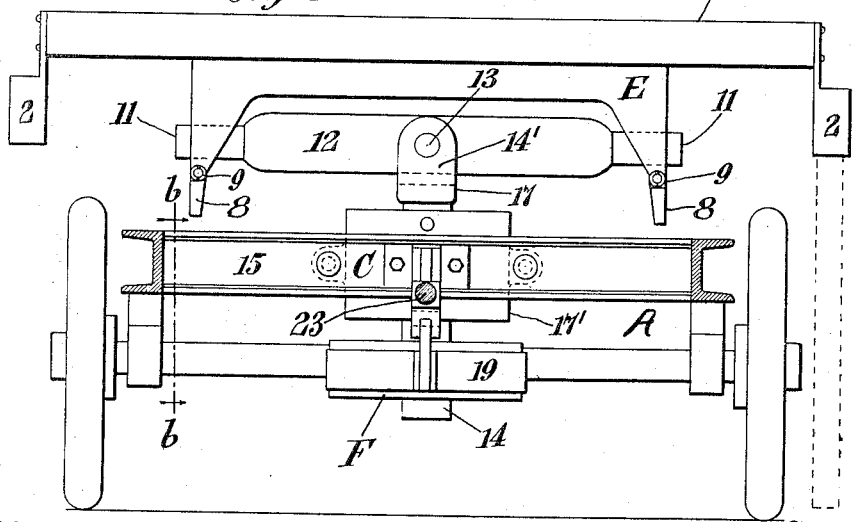

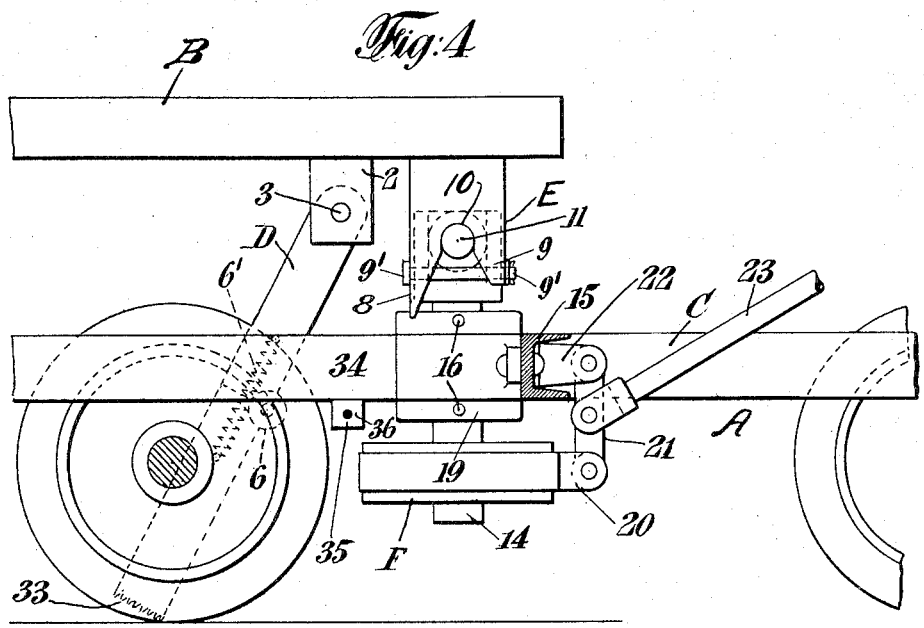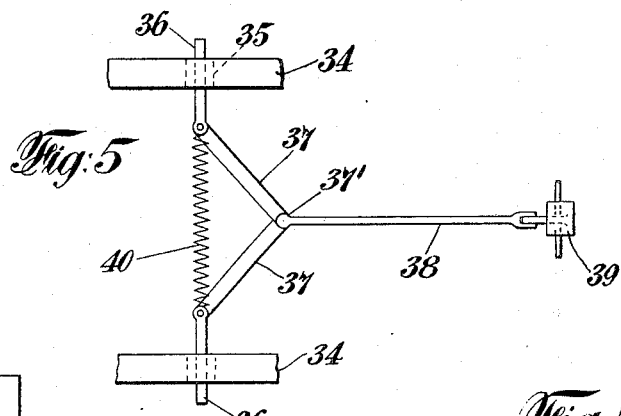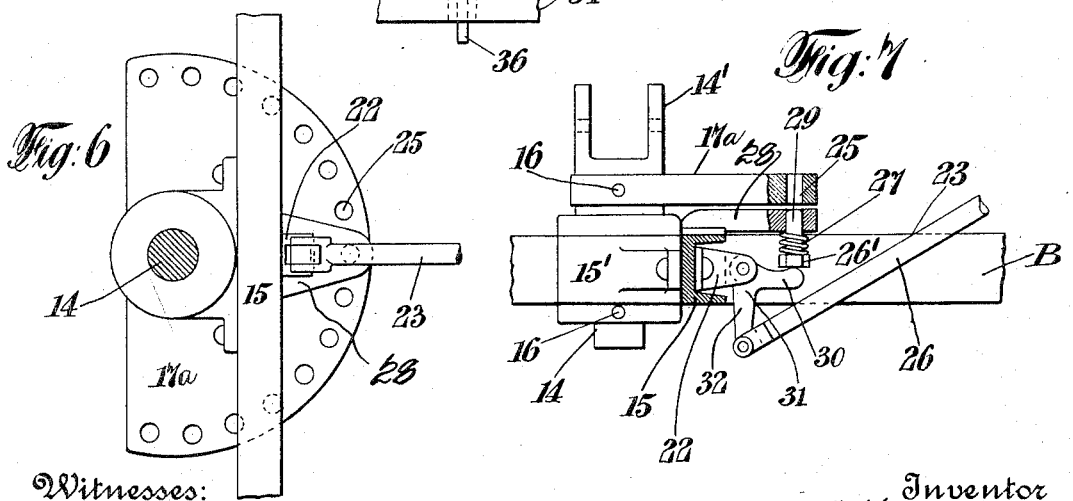

WILLIAM BARBER, OF BROOKLYN, NEW YORK, ASSIGNOR TO ADA S. BARBER, OF BROOKLYN, NEW YORK.

AUTOMOBILE.

1,179,793.  Specification of Letters Patent.  Patented Apr. 18, 1916.

Application filed July 14, 1914. Serial No. 850,962.

*To all whom it may concern:*

Be it known that I, WILLIAM BARBER, a citizen of the United States, residing at the borough of Brooklyn, in the county of Kings and State of New York, have invented certain new and useful Improvements in Automobiles, &c., of which the following is a specification.

The objects of my invention are: first: to provide a vehicle of any kind, whether motor or otherwise propelled, with means for locking the fifth-wheel or steering mechanism, of whatever form, in any required position, so that any movement of the vehicle to front or rear will be made without liability of skidding, or departure from the radius or tangent of turn, predetermined by the relative position into which such mechanism has been locked prior to the initial movement; and second: to provide a motor-tractor having such traverse locking mechanism, with means for easily connecting and disconnecting the tractor from the trailer, and for supporting the connecting end of the trailer while disconnected from the tractor.

In the particular embodiment of my said invention herein shown, the complete device consists in substance, of a tractor provided with a motor; a trailer, a king-bolt, revolubly mounted on the tractor, and adapted to be removably secured to the trailer by a universal or double rock-joint connection; and mechanism for locking the tractor in any required position against traverse movement relative to the trailer; the construction including mechanism for supporting the connecting end of the trailer when released from the tractor; and for automatically releasing and re-connecting the trailer to and from the tractor.

Such invention is fully shown in the following specification, of which the accompanying drawings form a part, wherein similar letters, or numerals of reference designate like or equivalent parts, wherever found, throughout the several views, and in which:—

Figure 1 is a side vew in elevation of my invention, as the same appears when applied to a tractor and trailer motor-truck. Fig. 2 is a side view in detail of the upper portion of the trailer supporting mechanism, co-acting with the tractor and trailer connecting and disconnecting mechanism; Fig. 3 is a front view of the construction shown in Fig. 1, partially in section, looking toward the left of such Fig. 1; taken on the line *a—a;* Fig. 4 is a side view in detail, on an enlarged scale, partially in section, of the mechanism locking the tractor and the trailer against relative movement, one with the other, while making a turn; the tractor being taken in section on the line *b—b* of Fig. 3, looking from the left in the direction of the arrow; Fig. 5 is a top-plan view in detail of movable stops actuated by the driver, adapted to be thrown into position so as to contact with and break the supporting legs in the connecting of the tractor and trailer. Fig. 6 is a bottom-plan view, and Fig. 7, a side-view, (partially in section) of the construction shown in such Fig. 6 showing a modified form of the king-bolt or fifth wheel locking mechanism; which differs from that shown in the preceding figures in that the locking is by a positive bolt and perforation, or slot, connection, instead of by a friction brake.

Referring to the drawings:—The reference letter A, indicates the tractor, and B the trailer secured thereto by a fifth-wheel connecting mechanism C. Pivoted to the forward or connecting portion of the trailer B (usually one at either side, as shown in Figs. 1, 2 and 4) are supporting legs D, which serve as forward supporting means for the trailer when released from the tractor; as clearly shown in dotted lines in Figs. 1 and 2. Such legs D, when the tractor and trailer are connected, are supported in the horizontal position shown in Fig. 1, by means of a catch-lock 1, of any suitable form of construction, which may easily be released; and are pivotally secured to the trailer-frame in a suitable side bracket 2 (bolted to the trailer-frame) of the form more clearly shown in detail in Fig. 2, by means of a pivot bolt 3; and it will be seen that by reason of the brackets having a top wall 4, that the legs cannot be swung upward upon such pivot joint farther than horizontally, when they will be caught and held in position by the catches 1, and that in like manner when swung vertically they will be prevented by the front wall 5 of such bracket from swinging to the front farther than a short distance beyond the vertical line, as clearly indicated in dotted lines in Fig. 1, and it is self-evident that such forward extension of the bottom of the legs will render the trailer much more stable against accidental displacement than if such legs are vertical, although either form may be used. It will be seen from an examination of the drawings that the length of the supporting legs D is such that when the same are released from the catches 1, the same will drop down into the inclined position indicated in full lines in Fig. 4.

As shown in the drawings, the form of supporting leg which I prefer to use is provided on the forward fall with a knuckle-joint 6 usually and preferably, but not necessarily located at or about the center thereof; so that when in the vertical position, the leg may be broken at such joint toward the rear. Usually secured at one end to the upper member and at the lower end to the lower member of the leg, by suitable bolts, etc., is a strong spring or springs, 6′, usually of the helico-spiral form shown, which are of sufficient resiliency to keep such two members always in line one with the other, except when considerable pressure is being exerted upon the forward side of the leg adjacent to the knuckle joint.

Rigidly secured to the main frame of the trailer, adjacent to the forward end thereof, transversely on the under side, is the securing fork E of the form shown in Figs. 1, 3 and 4, by which the tractor and trailer are removably secured together. Formed integral therewith, at either end thereof, are long rear lugs 8. and the like shorter front lugs 9, forming between each of such lugs 8 and 9 a journal box 10, to receive the cylindrical journal ends 11 of the securing or journal rock bar 12, pivotally secured at its center to the king-bolt 14 by a pivot bolt 13: such king-bolt being provided for this purpose with the slotted-head 14′ as clearly shown in Figs. 3 and 7.

The king-bolt 14 passes down through a journal-box formed in and through a fifth-wheel boss securely bolted to the front cross-bar 15 of the main frame of the tractor; and rigidly secured to the lower end of such king-bolt in any suitable manner is the friction brake-wheel F, and also rigidly secured thereon, above and below the fifth-wheel boss 15′, by suitable set-screws or bolts are securing disks 17 and 17′ which prevent vertical displacement of the king-bolt in the boss 15′, while permitting of a relative free vibration thereof therein. When in the connected position shown in the drawings (Figs. 1 and 3) the tractor and trailer are locked together against accidental disengagement (as by jolting when going over rough roads) by suitable securing means, such as bolts, or cotter or other like pins 9′, which pass through the lugs 8 and 9 of the forks at either end of E slightly below the journal ends 11 of the rock-bar 12, thus leaving considerable play thereto, while preventing passing of same from the forks until such pins are withdrawn. If desired, instead of securing bolts or pins removable by hand, catch or snap-bolts permanently secured to the trailer securing fork E may be provided, adapted to be retracted so as to permit of withdrawal and reëntrance of the rock-bar 12 into and out of the fork-piece E by means of suitable levers and connecting mechanism carried by the tractor and actuated by the driver from his seat; whereby the tractor and trailer may be connected or disconnected without the driver descending from his seat.

The fifth-wheel braking mechanism by which the tractor and trailer are locked together at any desired relative angle or tangent of traverse, so as to compel the vehicle to make the turn upon a circle of the required pre-determined radius, without departure therefrom, or danger of slipping or skidding, may be of many various forms, and while the two thereof shown herein are highly efficient for the purpose desired, I do not limit myself thereto, but I consider any locking mechanism for a similar purpose, used on any vehicle, to be clearly within the scope of my invention.

The construction that I prefer to use is that shown in Figs. 1, 3 and 4, wherein a friction brake-wheel F, is rigidly secured to the lower end of the king-bolt 3, and is provided with a suitable brake-band 19, of the well known form used in traction brakes; which is kept normally in the expanded and non-braking position out of contact with the peripheral surface of the brake-wheel by its own resiliency; but which is so connected at its opening or slot 20, through suitable mechanism (not shown), for drawing the ends thereof together, so as to make contact with the wheel, with the lever 21, pivoted at its upper end to a bracket 22, formed integral with, or rigidly secured to, the cross-bar 15 of the tractor frame, so that when the lower end of the lever 21 is forced to the front by the drawing forward of the lever connecting rod 23, having at its forward end adjacent to the driver's seat an actuating lever 24, (usually of the pedal form shown in Fig. 1), which is provided with suitable mechanism for locking the same in the extreme forward position when the brake is fully set, so as to lock the tractor and trailer against relative traverse. But inasmuch as this braking mechanism *per se* is old, as applied to traction brakes, and in its construction forms no part of my invention save in combination, and as applied to the fifth wheel mechanism, I have not deemed it essential to more specifically show or describe the same herein.

The advantage of using a band or other friction brake, lies in the fact that especially in heavy trucks, for which my invention is specifically designed, some slight slip in the brake would be of benefit, when making a sharp turn, by preventing undue strain upon the mechanism and consequent injury to the mechanism; but such slip would only be when the mechanism was strained almost to the breaking point. In lighter vehicles, on the contrary, a positive non-slipping locking mechanism may be used without danger, and in Figs. 6 and 7 I have shown one such of extreme mechanical simplicity and cheapness of construction, which is operated through a connecting lever rod 23, in the same manner as is the friction brake-mechanism before described.

In this modified form of fifth-wheel locking mechanism, the upper securing disk 17 is of segmental form as shown in Fig. 6 and is provided adjacent to the periphery with lock-slots or perforations 25, adapted to receive a lock-pin 26, having a head 26′ normally kept in the depressed and non-working position shown in Fig. 7, by a suitable spring 27, interposed between the head 26′, and the under surface of a bracket 28, rigidly secured to or formed integral with the main frame of the tractor, in a suitable perforation or slot 29 of which, the lock-pin 26 freely reciprocates; the head 26′ of such pin 26 contacting with the horizontal arm 30 of a bell crank lever 31 pivoted to the bracket 22, to the vertical arm 32 of which lever 31 is pivotally secured the rear end of the lever connecting rod 23 of the same form and actuated in the same manner through a pedal 24, as the rod 23 of Figs. 1, 3 and 4; and it will be seen that the spring 27 serves the double purpose of normally depressing the lock-pin 26, and through the pressure exerted upon the arm 30 of the lever 31, also keeps the connecting rod 23, and its forward actuating lever similar to 24 of Fig. 1 normally in the extreme rearward position.

Inasmuch as the operation of this mechanism is self-evident from the drawings, and the foregoing, further description is deemed superfluous.

Fig. 5 is a top-plan view in detail of the mechanism for tripping the supporting legs D upon reconnecting the tractor with the trailer. In such Fig. 5, 34 designates the two side pieces of the main frame of the tractor, to each of which is rigidly secured a slip journal box 35, in and out through which reciprocates the stop-journals 36, pivotally connected at the inner end with the lever bars 37, connected by a common pivot joint 37′, with the rear end of the lever connecting-rod 38, forced to the rear (when desired) so as to throw the stop-journals 36 out of the boxes 35 to the limit of their throw, by a suitable lever actuated by the driver from his seat, usually by a pedal lever 39, similar to the lever 24 (Fig. 1) and like it, usually provided with a suitable locking device (not shown) for locking same in the working position, with the stop journals fully projected; a suitable spring 40, usually of helico-spiral form, and located as shown between the rear ends of the stop-journals, or other suitable means, being provided for normally keeping the stop-journals in the retracted position.

The journal boxes 35 are so located, that when the stop-journals are in the outward position; (the tractor and trailer being disconnected) and the tractor is backed beneath the trailer, such stop-journals will contact with their respective legs D, at or adjacent to the knuckle-joint 6, at the instant when the journal-ends 11, of the rock-bar 12, has passed underneath the front lugs 9 of the connecting fork piece E of the trailer, and as the rear movement of the tractor continues, the pressure thus exerted on the legs at the knuckle-joint, will break the legs at the joint toward the rear, when the front of the trailer will drop by gravity into the position shown in Figs. 1, 3 and 4, when the front portion of the trailer will be supported in the forks of E, upon the journal ends 11 of the securing rock bars 12; and the securing pins or bolts 9 being then inserted in place, the tractor and trailer will be again securely connected and ready for the road.

The trailer and tractor being locked together, and it being desired to disconnect the same, the legs D, (usually one on either side of the trailer), are released from the catches 1, and allowed to drop down into the inclined position shown in dotted lines in Figs. 1 and 4, such legs being slightly longer than the distance between the ground and the supporting pivot-bolt 3, when the tractor and trailer are connected (say about 6 inches longer), and such legs are usually provided at the bottom ends with spikes 33, such legs having been lowered into such inclined position as shown in Fig. 4, it will at once be seen that if the tractor is moved farther to the rear, that the spikes 33 will catch hold upon the ground, and the trailer will ride up upon the legs D into the inclined position shown in dotted lines in Figs. 1 and 4, until the legs D are vertical, (or a little past verticality,) when further pivotal movement thereof will be stopped by the abutment of the front side against the front wall 5 of the bracket 2 (Fig. 2); and at this point the forward end of the trailer will be supported upon the legs D; and (the securing pins 9′, having of course been removed prior to the beginning of the rearward movement,) the fork-piece E, when the supporting legs are in the vertical position, will have been lifted off from the rock-bar 12, to such a height that the lower ends of the short front lugs 9 of the forks are above the journal ends 11 of the rock-bar 12, when the tractor being driven to the front, it will pass out from under the trailer and leave the same standing in position, with the front end supported by the legs D.

In the case of trucks of various forms of construction differing slightly from that shown, (especially in the case of trucks of exceedingly long bodied trailers, coupled with comparatively short tractors,) instead of having two supporting legs D, one upon either side, a single one may be located underneath the trailer on the central axial line thereof, and to the rear of the tractor. And in such case a single stop-journal reciprocating to the front and rear, actuated by the connecting rod 38, which may be used for breaking the leg at the knuckle-joint, is provided in place of the two side-wise reciprocating stop-journals herein shown.

Many modifications and changes in the construction, combination and arrangement of the various parts of my improved automobile, etc., other than those shown herein may be used without departing from the scope of my invention; and I do not intend to limit myself to the exact construction or arrangement, or combinations set forth.

I claim:—

1. In a vehicle tractor, and a trailer, a fifth-wheel mechanism for connecting them and having a king-bolt secured to the upper member of such mechanism, and forming a bearing for the lower member; a locking-wheel or member, rigidly secured to the king-bolt; mechanism for locking such locking-wheel or member in any required relative angular position; and mechanism actuated from the tractor for operating the locking mechanism.

2. A trailer; a tractor; a connection removably securing the trailer to the tractor, operated by raising and lowering the front end of the trailer; a supporting leg pivoted to the trailer adjacent to the front end, adapted to have its free end supported from the rear of the pivot-joint when traveling, of such length that when in a vertical position, such leg will support the front end of the trailer at such a height as to disconnect the same from the tractor; and stopping mechanism carried by the tractor for forcing the supporting leg rearward in re-connecting, so as to permit the trailer to fall by gravity into the connecting position.

3. A trailer; a tractor; a connection removably securing the trailer to the tractor, operated by raising and lowering the front end of the trailer; and a supporting leg pivoted to the trailer adjacent to the front end, adapted to have its free end supported from the rear of the pivot-joint when traveling, of such length that when in a vertical position such leg will support the front end of the trailer at such a height as to disconnect the same from the tractor; and stopping-mechanism carried by the tractor for forcing the supporting-leg rearward in re-connecting, so as to permit the trailer to fall by gravity into the connecting position.

4. A trailer; a tractor; a connection removably securing the trailer to the tractor, operated by raising and lowering the front end of the trailer; a supporting-leg pivoted to the trailer adjacent to the front end adapted to have its free end supported from the rear of the pivot-joint when traveling of such length that when in a vertical position such leg will support the front end of the trailer at such a height as to disconnect the same from the tractor; a knuckle-joint in the supporting-leg breaking from the vertical toward the rear only; and stopping mechanism carried by the tractor for forcing the supporting-leg rearward in re-connecting, so as to permit the trailer to fall by gravity into the connecting position.

5. A trailer; a tractor; a connection removably securing the trailer to the tractor, operated by raising and lowering the front end of the trailer; and a supporting-leg pivoted to the trailer adjacent to the front end adapted to have its free end supported from the rear of the pivot joint when traveling, of such length that when in a vertical position such leg will support the front end of the trailer at such a height as to disconnect the same from the tractor; a knuckle-joint in the supporting-leg breaking from the vertical to the rear only; and stopping-mechanism carried by the tractor adapted to contact with the supporting leg so as to break the same at the knuckle-joint upon the rearward re-connecting movement of the tractor so as to permit the trailer to fall by gravity into the connecting position.

6. A trailer; a tractor; a connection removably securing the trailer to the tractor, operated by raising and lowering the front end of the tractor; a supporting leg pivoted to the trailer, adjacent to the front end, adapted to have its free end supported from the rear of the pivot-joint when traveling, of such length that when in a vertical position, such leg will support the front end of the trailer at such a height as to disconnect the same from the tractor; a knuckle-joint in the supporting-leg breaking from the vertical to the rear only; a resilient spring connected with either member of the leg normally maintaining the two members in position with their longitudinal axes co-incident; and movable stopping mechanism operating from the driver's seat carried by the tractor, adapted to break the leg by contact therewith upon the rearward movement of the tractor under the trailer so as to permit the trailer to fall by gravity into the connecting position.

7. A tractor; a trailer; a king-bolt revolubly mounted in the tractor; a securing rock-bar provided with journal-ends centrally pivoted to the head of the king-bolt by a horizontal pivot-bolt; a securing-fork extending downward from and across the forward end of the trailer-frame, having at either end journal-bearings lying between front and rear-lugs, the rear-lugs being longer than the forward-lugs; and means carried by the trailer for automatically forcing the forward end of the trailer upward so as to clear the journal-bearings of the securing-fork from the end-journals of the securing-rock bar, when the connected tractor and trailer are moved rearward.

8. A trailer; a tractor; a supporting leg for the trailer; a pivot-joint connecting the leg to the trailer, permitting the same to swing from the horizontal to the vertical through an arc of about 90 to 92 degrees only; a knuckle-joint in the leg breaking toward the rear only; and an adjustable stop carried by the tractor for breaking the leg to the rear.

9. A trailer; a tractor; two supporting legs pivoted to the trailer adjacent to the front end, swinging backward from the vertical to the horizontal through an arc of from 90 to 92 degrees only, such legs being of such length that when in a vertical position they will support the front end of the trailer at such a height as to disconnect the same from the tractor; a knuckle joint in the supporting legs breaking from the vertical to the rear only; and stopping mechanism carried by the tractor adapted to contact with the leg so as to break the same with the knuckle-joint upon the rearward reconnecting movement of the tractor so as to permit the trailer to fall by gravity into the connecting position; and mechanism actuated by the driver from his seat for throwing the stopping mechanism into and out of the working position.

10. In a vehicle, a trailer and a tractor detachably connected together, in combination with a supporting leg carried by the trailer adjacent its front end, and pivotally connected thereto, said leg being of such length that when the trailer is moved back thereon, by the tractor, said leg assumes a vertical position with its free end on the ground and automatically detaches the front end of the trailer from the tractor, and forms a support for the front end of the trailer.

Signed at the city, county and State of New York this 13th day of July, 1914.

WILLIAM BARBER.

Witnesses:
 FRED. F. WEISS,
 MABEL DITTENHOEFER.